United States Patent [19]
Silvestre et al.

[11] Patent Number: 5,940,501
[45] Date of Patent: Aug. 17, 1999

[54] COUNTER BASED RINGER INTERFACE

[75] Inventors: Philippe Silvestre, Antibes; Augusto Gallegos, Sophia Antipolis, both of France

[73] Assignee: VLSI Technology, Inc., San Jose, Calif.

[21] Appl. No.: 08/932,310

[22] Filed: Sep. 17, 1997

[51] Int. Cl.[6] .................................................. H04M 3/02
[52] U.S. Cl. .......................... 379/418; 379/373; 379/375; 84/DIG. 11
[58] Field of Search ..................................... 379/418, 372, 379/373, 374, 375, 382, 350, 252, 253, 413; 455/567; 340/384.71; 84/DIG. 11, 23

[56] References Cited

U.S. PATENT DOCUMENTS

| | | | |
|---|---|---|---|
| 3,840,689 | 10/1974 | Nakada | 84/DIG. 11 |
| 4,537,108 | 8/1985 | Shiramizu | 84/DIG. 11 |
| 4,641,563 | 2/1987 | Nagashima | 84/DIG. 11 |
| 4,884,294 | 11/1989 | Inagami | 455/567 |
| 4,962,527 | 10/1990 | Burns et al. | 379/418 |
| 5,001,748 | 3/1991 | Burns et al. | 379/418 |
| 5,208,852 | 5/1993 | Tamura et al. | 379/418 |
| 5,323,456 | 6/1994 | Oprea | 379/375 |
| 5,790,654 | 8/1998 | Eklof | 379/418 |

*Primary Examiner*—Forester W. Isen
*Assistant Examiner*—Jacques M. Saint-Surin
*Attorney, Agent, or Firm*—Wagner, Murabito & Hao

[57] ABSTRACT

The present invention comprises a ringer interface circuit for generating a ringer signal for controlling a telephone ringer. The circuit of the present invention includes a first frequency divider, a second frequency divider, and a third frequency divider. The first frequency divider is adapted to receive a ringer clock signal and generate a first divider frequency output therefrom. The second frequency divider is coupled to receive the first divider frequency output and is adapted to generate a second divider frequency output using the first divider frequency output. The second frequency divider is further adapted to generate a oversampled audio frequency signal. The third frequency divider is coupled to receive the second frequency divider output and is adapted to generate a period signal using the second frequency divider output. The circuit of the present invention also includes a modulator coupled to receive the oversampled audio frequency signal from the second frequency divider and the period signal from the third frequency divider. The modulator is adapted to generate a ringer frequency output having a pulse width according to the oversampled audio frequency signal and a level setting and a period according to the period signal. The modulator is further adapted to output the ringer signal to control a telephone ringer.

17 Claims, 10 Drawing Sheets

COUNTER BASED RINGER INTERFACE

TECHNICAL FIELD

The present invention pertains to the field of telecommunications ringer interfaces. More particularly, the present invention relates to an inexpensive counter based ringer interface.

BACKGROUND ART

Telephones are among the most common instruments in the telecommunications field. As such, telephones are utilized extensively throughout the various segments of the economy (e.g., business, industrial, and governmental organizations, to name a few). In a typical organization, telephones are used to receive calls from a variety of call "originators". These calls can be from people inside the organization or people outside the organization. The calls can be intercom based (e.g., within a specific building or campus setting), or externally originated telephone calls (e.g., utilizing the telephone company network). Due to the wide variety of possible originators, it has become common to include systems within the telephone which provide information regarding an incoming phone call. The information can include the origin of the call or the identity of the caller, among other things. It is beneficial to the user to have such information prior to actually "answering" the phone call.

One obvious method of obtaining the origin and identity of a phone call is the use of a receptionist or executive assistant to "answer" the call prior to the intended recipient of the call answering it. A more modern and efficient method is the use of specialized devices within the telephone receiver to indicate the origin and identity of the phone call. For example, some modern telephone receivers include built in alphanumeric displays to show information regarding a phone call before the call is answered. These telephone receivers include the necessary circuitry for implementing and supporting the included alphanumeric display. This solution is typically too costly and too complex for most applications. A much more commonly implemented solution is to vary the tone or other such characteristic of the audible "ring" of the telephone. Circuitry implementing a variable ringer is included within the telephone. Consequently, various types of incoming calls (e.g., an intercom based call, a long distance call, and the like) each have a distinctive audible ring characteristic.

There is a problem, however, in that the circuitry implementing the variable ringer significantly increases the cost of the overall telephone. Although a variable ringer implementation may be less expensive than the incorporation an alphanumeric display, the circuitry implementing the variable ringer adds a significant additional amount of expense to the cost of manufacturing the telephone. Most prior art variable ringers include a specialized variable ringer interface circuit. The prior art ringer interface circuits incorporate specialized analog circuitry for implementing the variable, distinctive ring characteristic. Such specialized analog circuitry typically includes sine wave oscillators for generating the various distinctive ring signals. Sine wave oscillators are disadvantageous because the oscillators require special filtering. The signal generated by the oscillators needs to be filtered prior to amplification, increasing total component count. Sine wave oscillators also consume excessive amounts of power, limiting their usefulness in power limited applications (e.g., portable phones, cellular phones, and the like). Additionally, the analog circuitry comprising the sine wave oscillators are more susceptible to noise than other digital circuitry included in the telephone.

Thus, what is required is a system which overcomes the problems associated with prior art variable ringer implementations. The required system should be less expensive than prior art sine wave oscillator based variable ringers. The required system should not consume excessive amounts of power. In addition, the required system should be relatively insensitive to noise. The present invention provides a novel solution to the above requirements.

DISCLOSURE OF THE INVENTION

The present invention comprises a ringer interface circuit for generating a ringer signal to control a telephone ringer. The ringer interface circuit of the present invention provides a variable ringer system which overcomes the problems associated with prior art ringer implementations. The system of the present invention is less expensive than prior art sine wave oscillator based variable ringers. The system of the present invention consumes less power than prior art ringer implementations. Additionally, the ringer interface circuit of the present invention is much less sensitive to noise.

In one embodiment, the ringer interface circuit of the present invention includes a first frequency divider, a second frequency divider, and a third frequency divider. The system of the present invention utilizes the first, second, and third frequency dividers to implement a pulse width modulation system to generate the ringer signal. The first frequency divider is adapted to receive a ringer clock signal and generate a first frequency divider output therefrom. The second frequency divider is coupled to receive the first frequency divider output and is adapted to generate a second frequency divider output using the first divider frequency output. The second frequency divider is further adapted to generate a oversampled audio frequency signal. The third frequency divider is coupled to receive the second frequency divider output and is adapted to generate a period signal using the second frequency divider output. The ringer interface circuit of the present invention also includes a modulator coupled to receive the oversampled audio frequency signal from the second frequency divider and the period signal from the third frequency divider. The modulator is adapted to generate a ringer signal having a pulse width according to the oversampled audio frequency signal and a period according to the period signal. The modulator is further adapted to output the ringer signal to control a telephone ringer. The first frequency divider is programmable such that the first frequency divider output can be varied. The modulator uses adjustable level signal, in combination with the oversampled audio frequency signal, such that the pulse width of the ringer signal can be varied.

In so doing, the system of the present invention provides a variable tone or period which controls the characteristic of the "ring" of a coupled telephone. The circuitry comprising the present invention can be easily included within the telephone such that various types of incoming calls (e.g., an intercom based call, a long distance call, and the like) each have a distinctive ring characteristic. Thus, a system in accordance with the system of the present invention provides information regarding an incoming phone call (e.g., its origin, the identity of the caller, and the like) prior to a user actually "answering" the phone call.

BRIEF DESCRIPTION OF THE DRAWINGS

The present invention is illustrated by way of example and not by way of limitation, in the figures of the accompanying drawings and in which like reference numerals refer to similar elements and in which.

BEST MODE FOR CARRYING OUT THE INVENTION

A ringer interface circuit for generating a ringer signal for controlling a telephone ringer is disclosed. In the following description, for the purposes of explanation, numerous specific details are set forth in order to provide a thorough understanding of the present invention. It will be obvious, however, to one skilled in the art that the present invention may be practiced without these specific details. In other instances, well known structures, devices, and processes are shown in block diagram form in order to avoid unnecessarily obscuring the present invention.

The present invention comprises a ringer interface circuit for generating a ringer signal for controlling a telephone ringer. The ringer interface circuit of the present invention includes a first, second, and third frequency divider. Each of the frequency dividers implement digital counters. The digital counters are used for deriving signal attributes of a ringer signal. This ringer signal ultimately controls, via some low cost external circuitry, the sound output of the ringer of a telephone. Such circuitry may include, for example, a low band pass filter or an H-bridge amplifier. The first frequency divider is adapted to receive a ringer clock signal and generate a first divider frequency output therefrom. The ringer clock signal functions as the input signal from which the base frequency of the ringer signal is derived. The output of the first frequency divider is subsequently coupled to the second and third frequency dividers where the pulse width and period attributes of the ringer signal are derived.

A modulator is coupled to receive inputs from the second and third frequency dividers. Using these inputs, the modulator generates a corresponding ringer signal. The ringer signal is subsequently output and coupled to the ringer of a telephone. In so doing, the system of the present invention provides a variable tone or period which controls the characteristic of the "ring" of the coupled telephone. In so doing, the ringer interface circuit of the present invention provides a variable ringer system which overcomes the problems associated with prior art ringer implementations and is less expensive. In addition, the system of the present invention consumes less power and is much less sensitive to noise. The system of the present invention and its benefits are described in greater detail below.

Figure 1A:
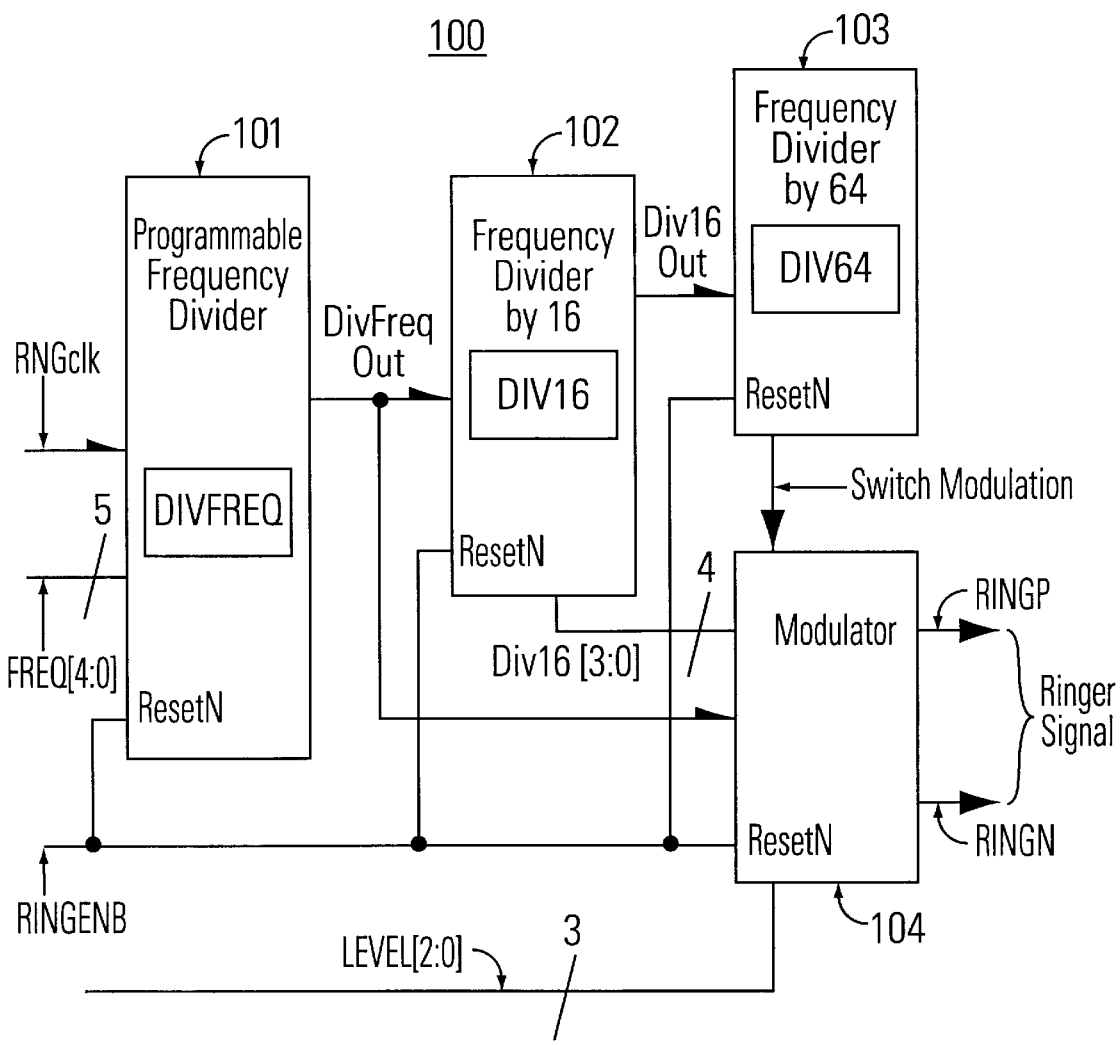
FIG. 1A shows a diagram of a ringer interface circuit in accordance with one embodiment of the present invention.

Referring now to FIG. 1A, a diagram of a ringer interface circuit 100 in accordance with one embodiment of the present invention is shown. Ringer interface circuit 100 includes a first, second, and third frequency divider. In the present embodiment, a programmable frequency divider 101 comprises the first frequency divider, a frequency divider "by 16" 102 comprises the second frequency divider, and a frequency divider "by 64" 103 comprises the third frequency divider. Programmable frequency divider 101 receives a ringer clock signal RNGclk and a frequency selection value FREQ[4:0] as inputs and generates as an output a DivFreqOut signal. Frequency divider by 16 102 receives DivFreqOut as an input and generates a Div16Out signal and a Div16[3:0] signal as outputs. Frequency divider by 64 103 receives Div 16Out as an input and generates a switch modulation signal as an output. DivFreqOut, Div16[3:0], and switch modulation are each received by a modulator 104 as inputs. Modulator 104 also receives a LEVEL[2:0] signal as an input. Modulator 104 generates a ringer signal and outputs the ringer signal via the differential outputs RINGP and RINGN. Each unit of ringer interface circuit 100 (e.g., programmable frequency divider 101, frequency divider by 16 102, frequency divider by 64 103, and modulator 104) is coupled to receive a ring enable signal RNGENB.

The present ringer interface circuit 100 implements a ripple counter architecture comprised of programmable frequency divider 101, frequency divider by 16 102 and frequency divider by 64 103 (hereafter frequency dividers 101–103). Each one of frequency dividers 101–103 implements an internal counter. Programmable frequency divider 101 decrements an internal 5 bit register DIVFREQ, frequency divider by 16 102 increments an internal register DIV16, and frequency divider by 64 103 increments an internal register DIV64. The ringer interface circuit 100 of the present invention uses frequency dividers 101–103 to digitally derive the ringer signal from the constant ringer clock signal RNGclk.

In the present embodiment, RNGclk is a digital clock signal having a constant frequency of 6.912 MHz. With the exception of the ring enable signal RNGENB, the signals of ringer interface circuit 100 are synchronous to RNGclk. RNGclk is received by programmable frequency divider 101 and is divided into DivFreqOut according to the value of FREQ[4:0]. FREQ[4:0] is a five bit input which loads the DIVFREQ register. FREQ[4:0] is a user programmable input. As DIVFREQ register is decremented to zero, it is reloaded with the value of FREQ[4:0]. In this manner, FREQ[4:0] controls the frequency of the DivFreqOut signal.

Referring still to FIG. 1A, the RNGENB signal functions as the asynchronous reset for ringer interface circuit 100. Driving RNGENB low couples a logical zero to the ResetN inputs of each of frequency dividers 101–103 and modulator 104. Consequently, driving RNGENB low asynchronously resets all three frequency dividers 101–103, resets modulator 103, and sets the DIVFREQ register to zero. When RNGENB is deasserted (e.g., a logical one) the value of FREQ[4:0] is transferred to DIVFREQ on the next rising edge of RNGclk. Programmable frequency divider 101 subsequently begins recursively decrementing the DIVFREQ register to zero and reloading it with the value of FREQ[4:0]. Each time DIVFREQ is decremented to zero, programmable frequency divider 101 a one RNGclk cycle, outputs a one RNGclk cycle, synchronous pulse, DivFreqOut. DivFreqOut is coupled to frequency divider by 16 102 and to modulator 104.

Frequency divider 102 receives DivFreqOut as an input and increments the register DIV16 synchronously with DivFreqOut. In the present embodiment, the register DIV16 is a four bit register. When the ring enable signal RNGENB is asserted (e.g., a logical zero) DIV16 is set to zero. After RNGENB is deasserted (e.g., a logical one) DIV16 begins incrementing. Upon reaching 15, a one cycle pulse is generated (i.e., Div16Out) and is coupled to frequency divider 103. On the following rising edge of DivFreqOut, the register DIV16 is set to zero to perform another 0–15 cycle. Additionally, the value of the register DIV16 is continually output to modulator 104 as the signal Div16 [3:0]. As DIV16 increments, Div16[3:0] increments correspondingly.

Frequency divider 103 functions by using the Div16Out signal to generate a symmetric square signal, Switch Modulation. Switch Modulation dictates the period of the desired audio signal (e.g., the audible audio signal generated from the ringer signal). Frequency divider by 64 103 includes a 6 bit internal register DIV64. DIV64 is set to zero when RNGENB is asserted. When RNGENB is deasserted, DIV64 is incremented synchronously with respect to Div16Out, until the value of DIV64 reaches 63. At 63, DIV64 is reset to zero and another cycle begins on the next rising edge of Div16Out. The Switch Modulation signal is set to zero when DIV64 transitions from 63 to 0 and is driven to one when DIV16 transitions from 32 to 33.

With reference still to FIG. 1A, modulator 104 receives the DIV16 register value via the Div16[3:0] signal. Modulator 104 also receives the 3 bit level signal LEVEL[2:0 ]. Modulator 104 uses the value of LEVEL[2:0] and the Div16[3:0] signal to determine the pulse width of the ringer signal. Modulator 104 reads the value of Div16[3:0] as it increments from zero to 15.

It should be appreciated that the system of the present invention utilizes a pulse width modulation system to generate the ringer signal. As described above, frequency divider 102 generates the Div16Out and the Div16[3:0] signals. Div16Out is 64 fold of the frequency of the ringer signal, and is often referred to as the "oversampled audio" signal. Div16[3:0] comprises a three bit signal describing the contents of the DIV16 register.

Figure 6:
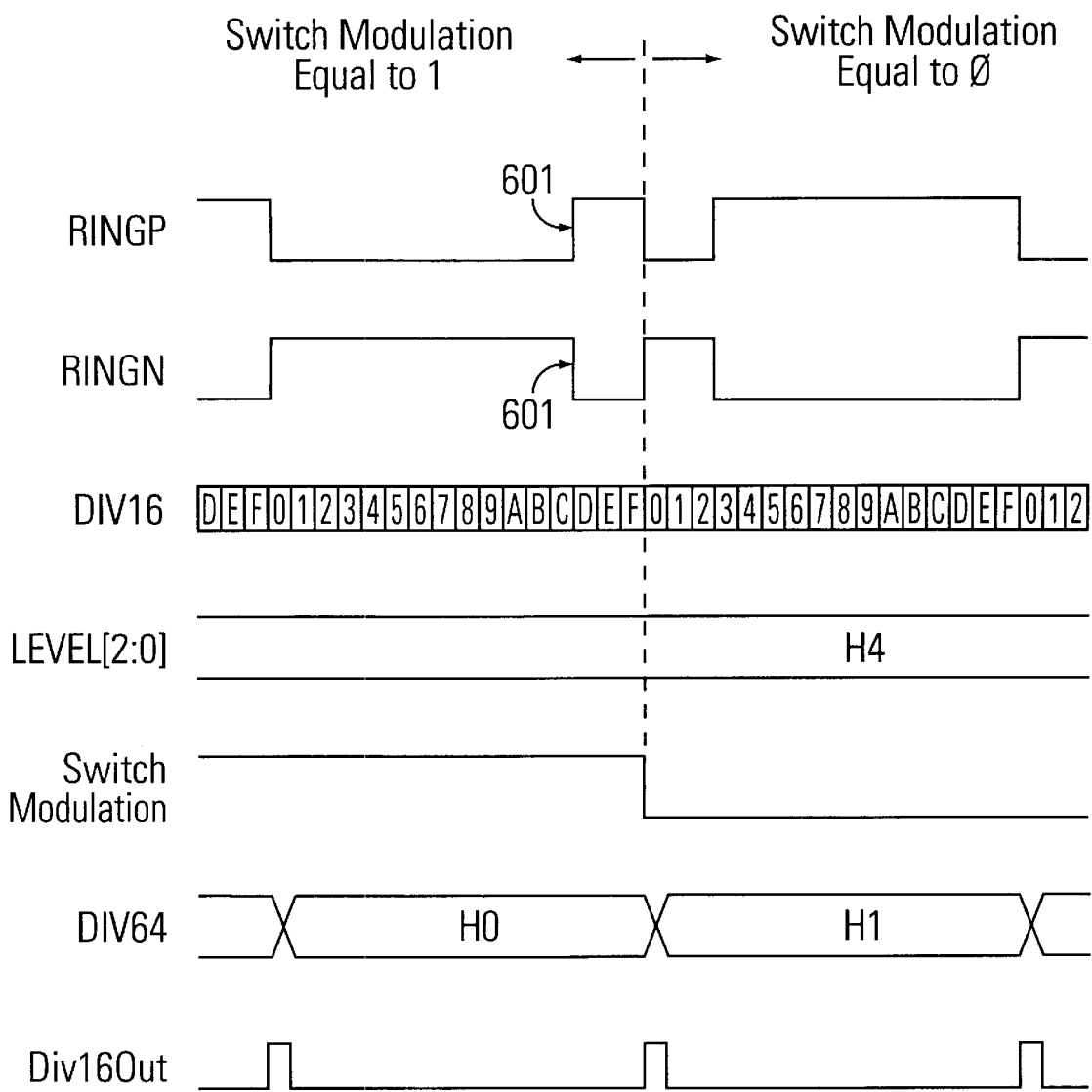
FIG. 6 shows a fifth timing diagram illustrating the operation of the ringer interface circuit of the present invention while the LEVEL[2:0] signal is set to 4.

In the present embodiment, modulator 104 is clocked by DivFreqOut. For each DivFreqOut cycle, modulator 104 uses Div16[3:0] and LEVEL[2:0] to determine the duty cycle of the ringer signal. Modulator 104 determines the duty cycle of the ringer signal based upon the value of both Div16[3:0] and LEVEL[2:0 ]. For example, where level 4 is selected by LEVEL[2:0 ], modulator 104 drives RINGP high when Div16[3:0] transitions from C to D and drives RINGP low when Div16[3:0] transitions from F to 0 (e.g., as shown in FIG. 6). Thus, in this example, RINGP has a pulse width modulated to be low 81.25% of the duty cycle. This is the case when the Switch Modulation signal is high.

When the Switch Modulation signal is low, the duty cycle determined by modulator 104 is inverted. For the same level 4, when Switch modulation is low, RINGP is driven high while Div16[3:0] goes from 0 to C (e.g., as shown in FIG. 6). Thus, when Switch Modulation is low, RINGP has a pulse width modulated to be high 85.25% of the duty cycle. Accordingly, this means the modulation rate is inverted when Switch Modulation transitions from 0 to 1. More power is dissipated while Switch Modulation is low (e.g., one half the audio period) and less power is dissipated while Switch Modulation is high.

Table 1 shows the pulse width modulation of RINGP corresponding to each level.

TABLE 1

| LEVEL [2:0] | Pulse Width Modulation |
|---|---|
| 111 | 100% high "1" during first half and low "0" during the second half |
| 110 | 93.75% high "1" during first half and low "0" during the second |
| 101 | 87.50% high "1" during first half and low "0" during the second |
| 100 | 81.25% high "1" during first half and low "0" during the second |
| 011 | 75.00% high "1" during first half and low "0" during the second |
| 010 | 68.75% high "1" during first half and low "0" during the second |
| 001 | 62.50% high "1" during first half and low "0" during the second |
| 000 | 56.25% high "1" during first half and low "0" during the second |

For example, when LEVEL[2:0] is zero and Switch Modulation is one, the ringer signal is driven to one when DIV16 reaches 7. The ringer signal remains one until the start of the next cycle, where it becomes zero until DIV16 reaches 7 once again. In this manner, modulator 104 generates a ringer signal having a pulse width determined by the LEVEL[2:0] signal and the state of DIV16 (i.e., the Div16 [3:0] signal.

Figure 1B:
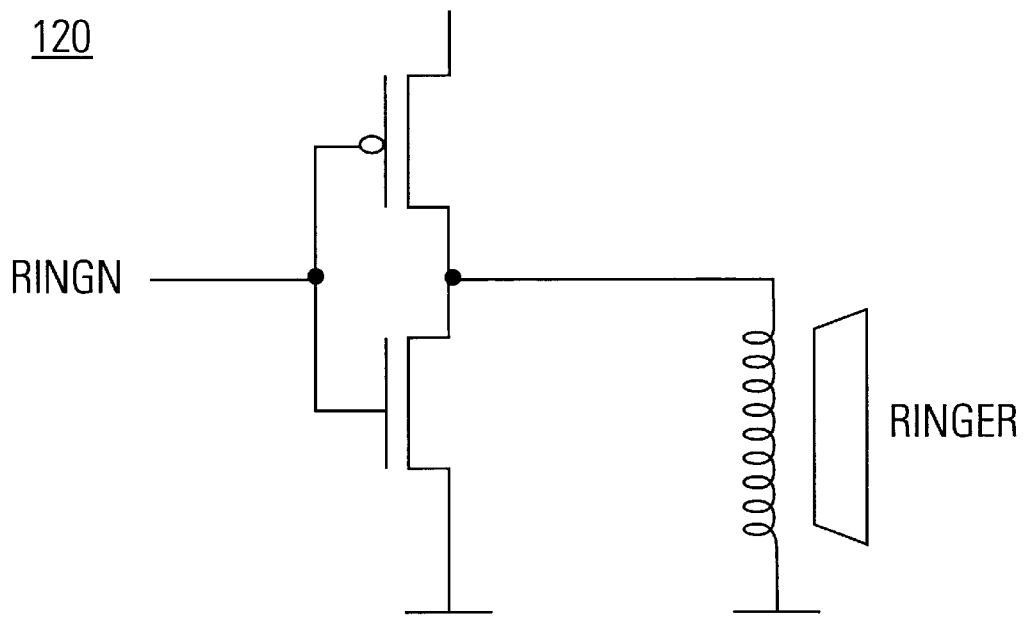
FIG. 1B shows a first and a second ringer signal amplifier architectures in accordance with one embodiment of the present invention.
Figure 1B:
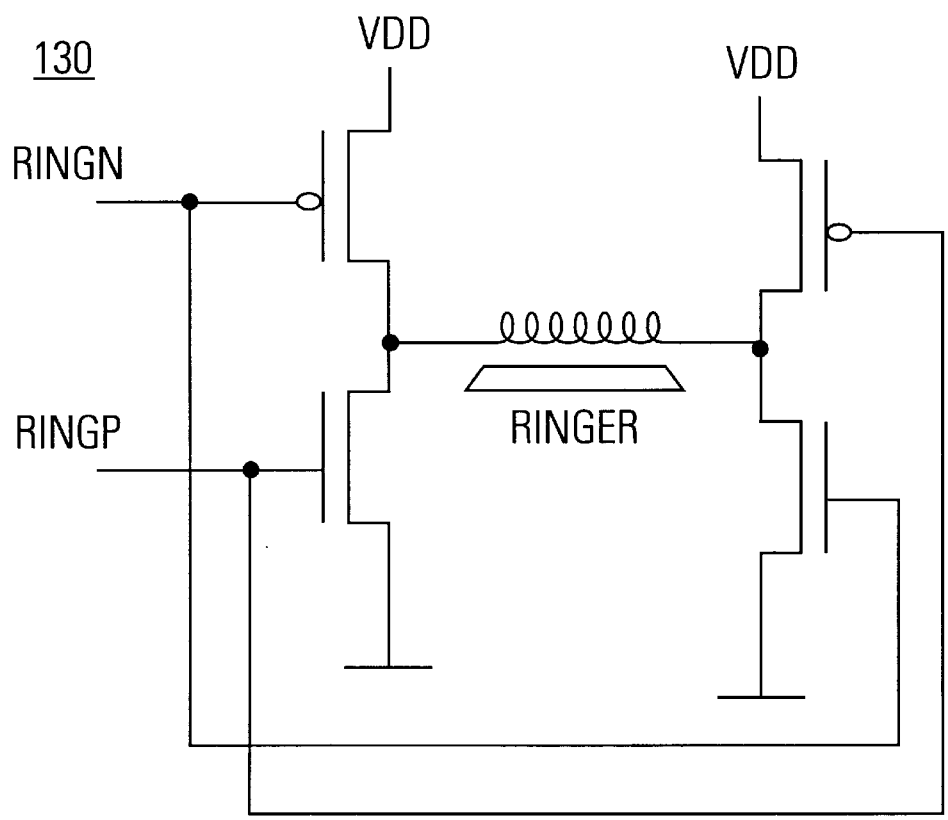

Referring now to FIG. 1B, two example amplifiers 120 and 130 are shown for RINGP and RINGN. Amplifier 120 shows a half bridge architecture for driving the ringer of the telephone. Amplifier 130 shows a full bridge architecture for driving the ringer of the telephone. The outputs RINGP and RINGN comprise standard differential signal outputs. As is well known in the art, analog signals are often transmitted in differential form within digital integrated circuits. The signal transmitted across RINGP is the same as the signal transmitted across RINGN, however, the phase is reversed. Thus, the ringer signal is represented by the difference between RINGP and RINGN. Both amplifiers 120 and 130 include low power consumption CMOS transistors working in digital mode (e.g., on/off).

In this manner, ringer interface circuit 100 provides a variable ringer system which overcomes the problems associated with prior art ringer implementations. Ringer 100 utilizes a straight forward counter based system implemented with frequency dividers (e.g., frequency dividers 101–103). Because ringer interface circuit 100 is digital, the system of the present invention consumes less power than prior art ringer implementations. Additionally, because ringer interface circuit 100 is digital, the present invention is much less sensitive to noise. Because ringer interface circuit 100 utilizes programmable frequency dividers to drive this ringer interface and generate different audio signal melodies, a program is required. However, in telecommunications fields, especially in mobile or cordless applications, software is included within the product (e.g., the mobile or cordless device) to drive the protocol. For example, in a mobile phone, the ringer, keypad, and display interface functions are driven by software included within the device. The operation of ringer interface circuit 100 and its associated signals are further described below.

Figure 2:
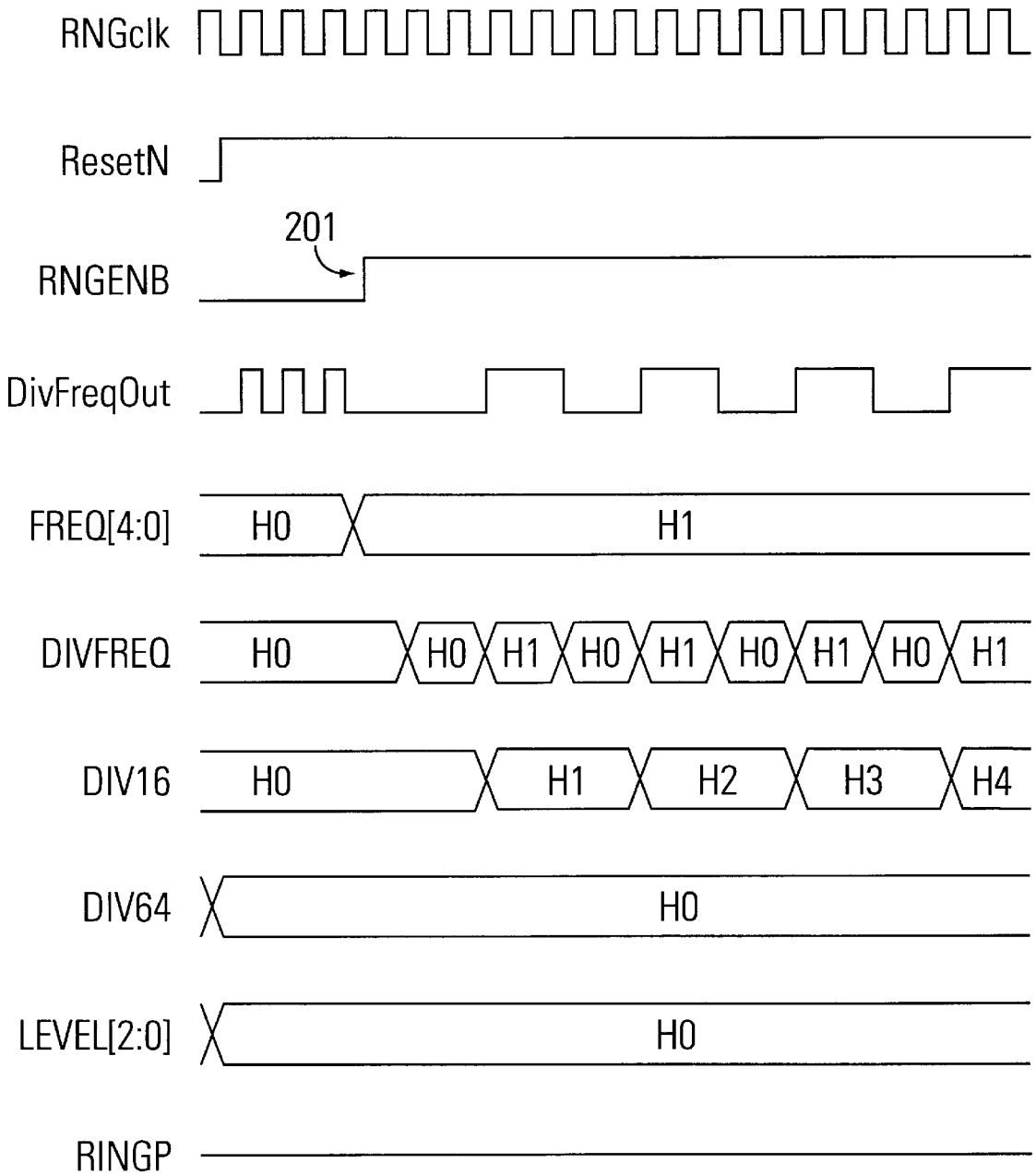
FIG. 2 shows a first timing diagram illustrating the DIVFREQ register after the RNGENB signal is driven high and the operation of the ringer interface circuit of the present invention.

Referring now to FIG. 2, a timing diagram 200 of the operation of ringer interface circuit 100 of the present invention is shown. Timing diagram 200 shows the DIVFREQ register after RNGENB is driven high. Line 201 shows the deassertion of RNGENB. It should be noted that, in accordance with the present embodiment, for FREQ [4:0]=0 (shown as H0 in timing diagram 200), DivFreqOut follows RNGclk. After RNGENB is driven high (e.g., line 201), FREQ[4:0] is 1 (e.g., H1) and DivFreqOut is generated by programmable frequency divider 101 accordingly.

Figure 3:
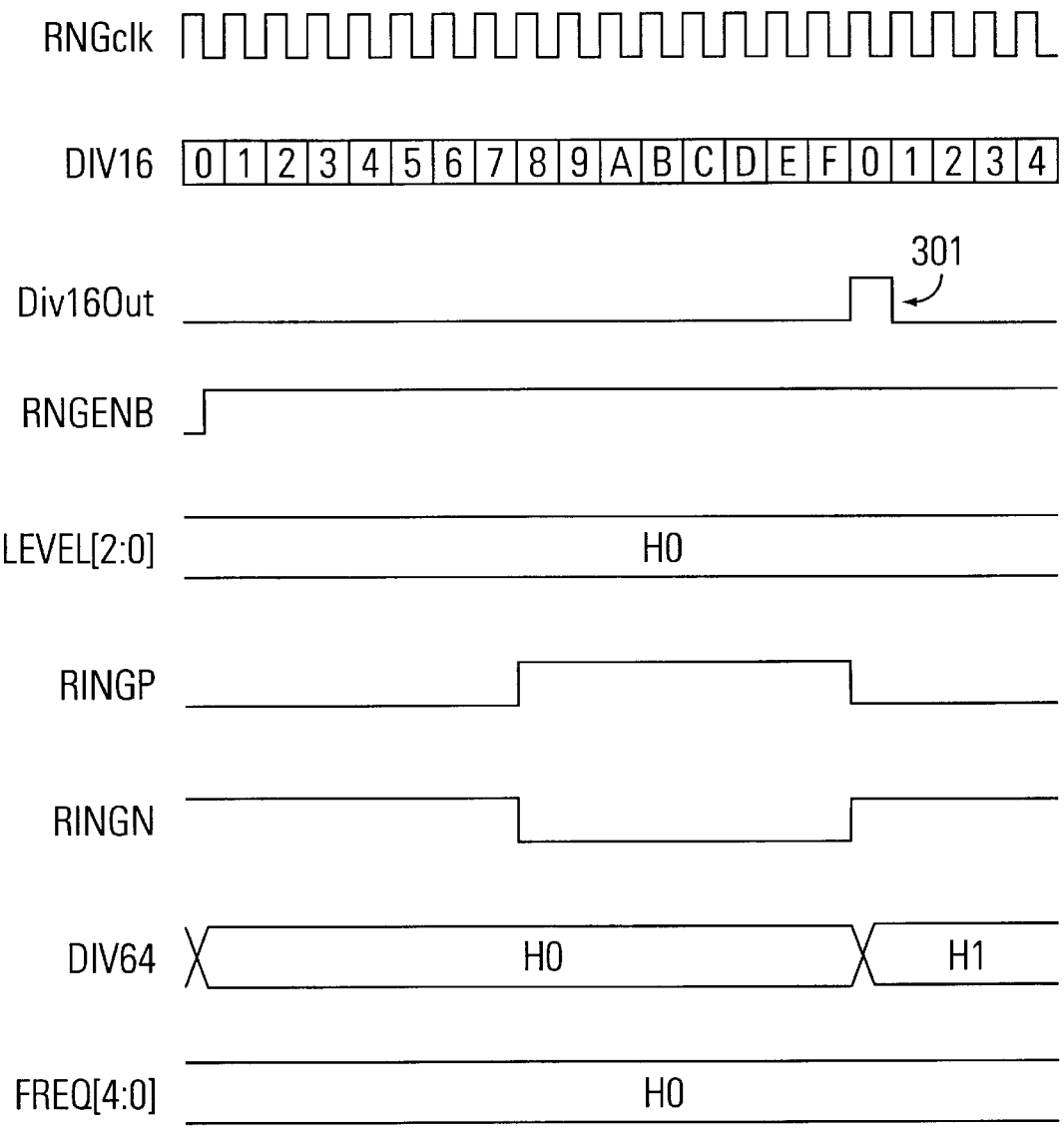
FIG. 3 shows a second timing diagram illustrating the signals associated with one Div16Out cycle and the operation of the ringer interface circuit of the present invention.

FIG. 3 shows a timing diagram 300 of the operation of ringer interface circuit 100 of the present invention. Timing diagram 300 shows the signals associated with one Div16Out cycle, as shown by line 301. When RNGENB is driven high, the DIV16 register begins incrementing. Upon reaching 15 (e.g., F hexadecimal), the Div16Out signal is pulsed on the next rising edge of RNGclk. FIG. 3 also shows that RINGP and RINGN are symmetrical when LEVEL[2:0] is set to zero (e.g., yielding a 56.25% duty cycle in accordance with table 1).

Figure 4:
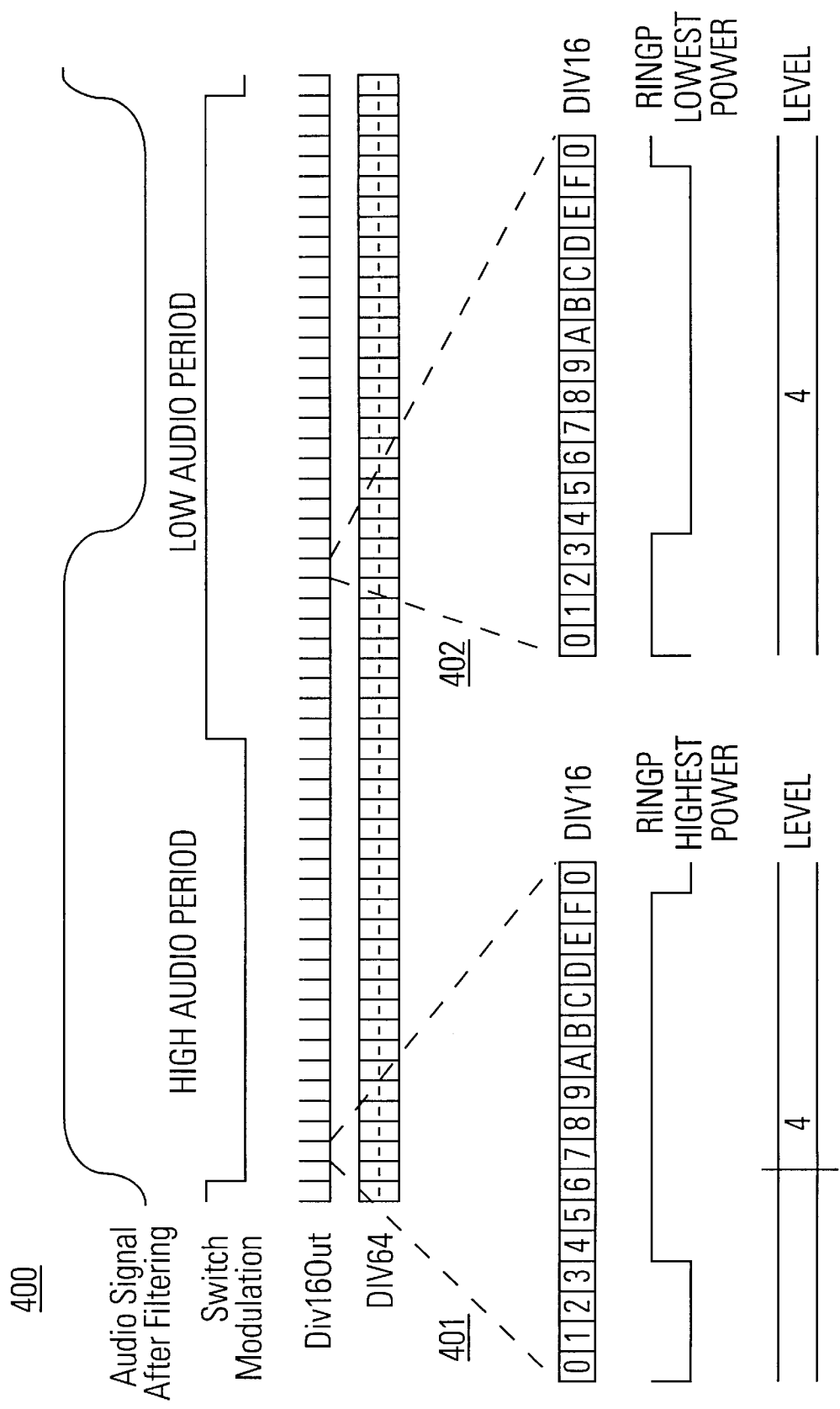
FIG. 4 shows a third timing diagram illustrating the relationship between the Switch Modulation signal, the Div16Out signal, and the contents of the register DIV64 of the ringer interface circuit of the present invention.

FIG. 4 shows a timing diagram 400 of the operation of ringer interface circuit 100 of the present invention. Timing diagram 400 shows the relationship between the Switch Modulation signal, the Div16Out signal, and the contents of the register DIV64. The Switch Modulation signal is set to zero when DIV64 transitions from 63 to 0 and is driven high on the 32 to 33 transition. DIV64 is incremented synchronously with Div16Out. The audio signal after filtering is shown with respect to Switch Modulation. A low Switch Modulation state corresponds to a high audio period while a high Switch Modulation state corresponds to a low audio period. FIG. 4 also shows two expanded views, view 401 and view 402 of a Div16Out cycle. In views 401 and 402, the contents of the DIV16 register, the RINGP signal, and the level signal (e.g., LEVEL[2:0 ]) are shown. View 401 shows RINGP while Switch Modulation is low, for the highest power of the audio signal, and view 402 shows RINGP while Switch Modulation is high, for the lowest power.

Figure 5:
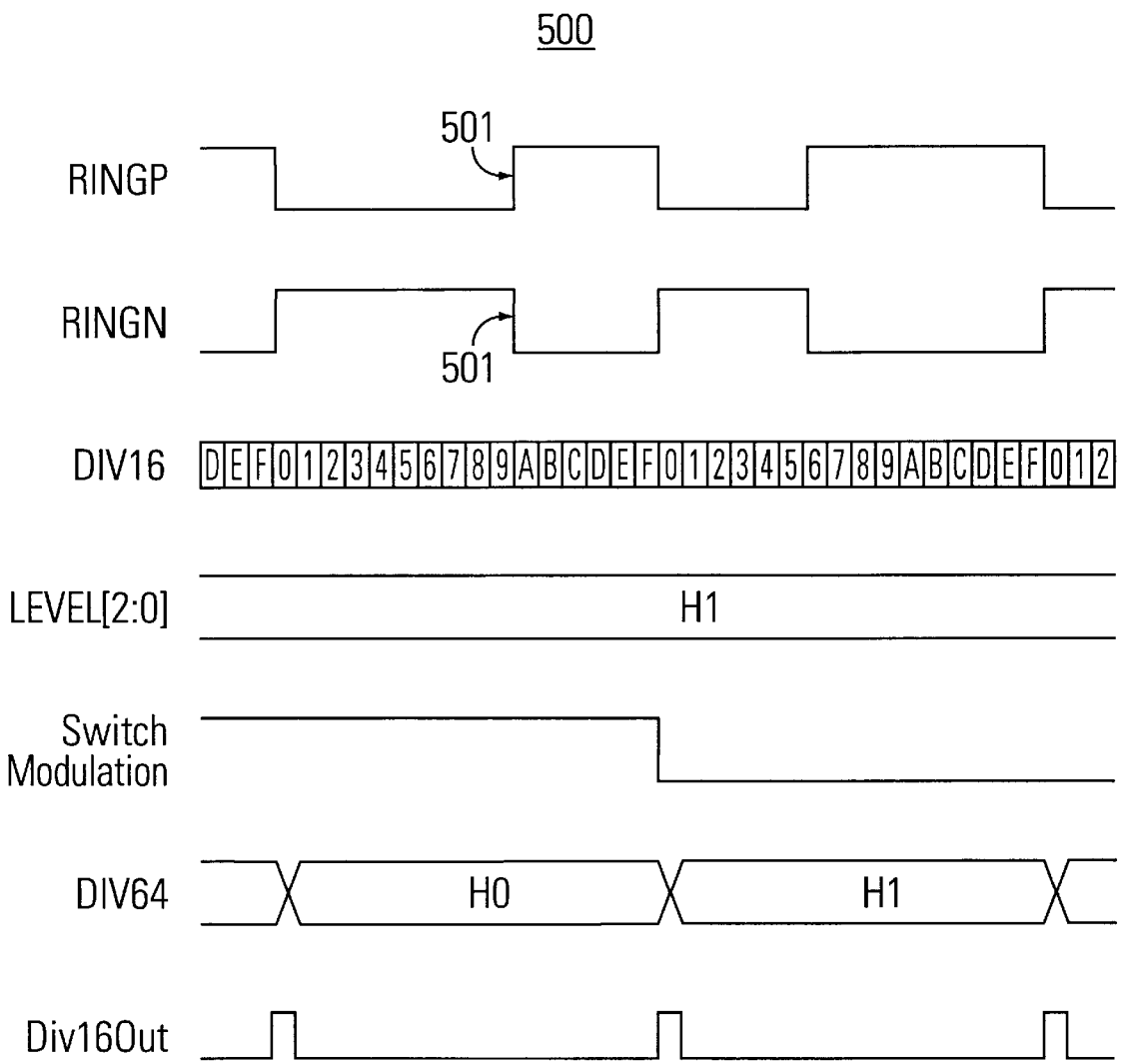
FIG. 5 shows a fourth timing diagram illustrating the output of RINGP and RINGN (e.g., the ringer signal) with respect to DIV16 register and LEVEL[2:0] signal of the ringer interface circuit of the present invention.

FIG. 5 shows a timing diagram 500 of the operation of ringer interface circuit 100 of the present invention. Timing diagram 500 shows the output of RINGP and RINGN (e.g., the ringer signal) with respect to DIV16 and LEVEL[2:0 ]. In timing diagram 500, LEVEL[2:0] is set to 1, shown as H1. Additionally, RINGP and RINGN are shown as the Switch Modulation signal transitions from zero to one. It should be noted that where LEVEL[2:0] is set to 7, the output of modulator 104 (e.g., the ringer signal) is equal to the Switch Modulation signal. As described above, where LEVEL[2:0] is set to 1, as in timing diagram 500, the ringer signal is asserted (e.g., RINGP driven high and RINGN driven low) one increment after DIV16 transitions from 8 to 9, shown by line 501.

It should be noted that the frequency divider 103 and the modulator 104 are clocked with the same signal, which corresponds to a 16-fold over sampling frequency (i.e., DivFreqOut from FIG. 2). It should also be noted that the period divider feature (e.g., the variable pulse width) can be optionally disabled. In addition, a logical AND is performed at the output with the RNGENB bit to avoid power loss in the external circuitry coupled to RINGP and RINGN.

FIG. 6 shows a timing diagram 600 of the operation of ringer interface circuit 100 of the present invention. Timing diagram 600 is similar to timing diagram 500, except that in timing diagram 600, LEVEL[2:0] is set to 4, shown as H4. Hence, the ringer signal is asserted (e.g., RINGP driven high and RINGN driven low) one increment after DIV16 transitions from B to C, as shown by line 601. As described above, the Switch Modulation signal inverts the modulation rate of RINGP and RINGN as it transitions (e.g., from 1 to 0). One the left side of diagram 600, Switch Modulation is high, while on the right side of diagram 600 Switch Modulation is low. Accordingly, less power is dissipated in the first half of the ringer signal period (e.g., on the left) than in the second half of the ringer signal (e.g., on the right).

Figure 7:
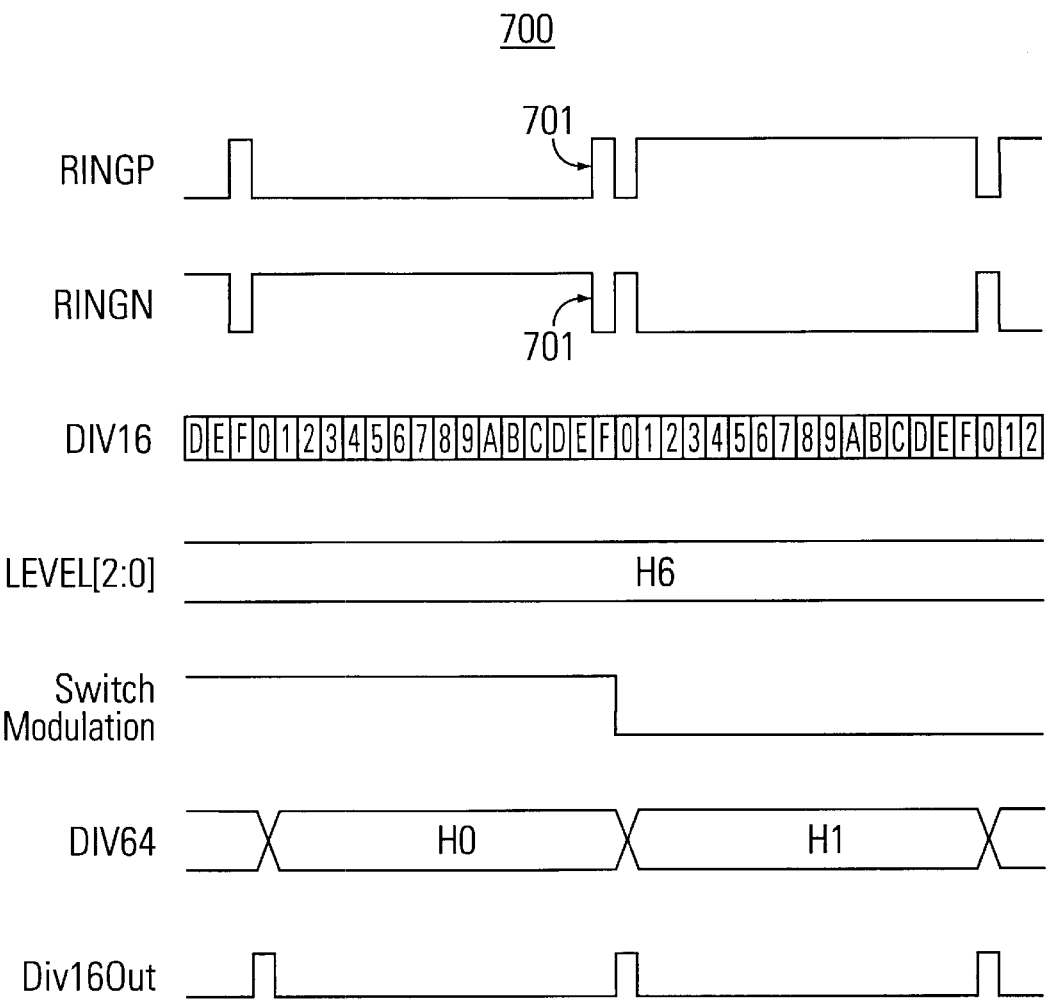
FIG. 7 shows a sixth timing diagram illustrating the operation of the ringer interface circuit of the present invention while the LEVEL[2:0] signal is set to 6.

FIG. 7 shows a timing diagram 700 of the operation of ringer interface circuit 100 of the present invention. Timing diagram 700 is similar to timing diagrams 500 and 600, except that in timing diagram 700, LEVEL[2:0] is set to 6, shown as H6. Consequently, the ringer signal is asserted one increment after DIV16 transitions from D to E. This is shown by line 701.

Figure 8:
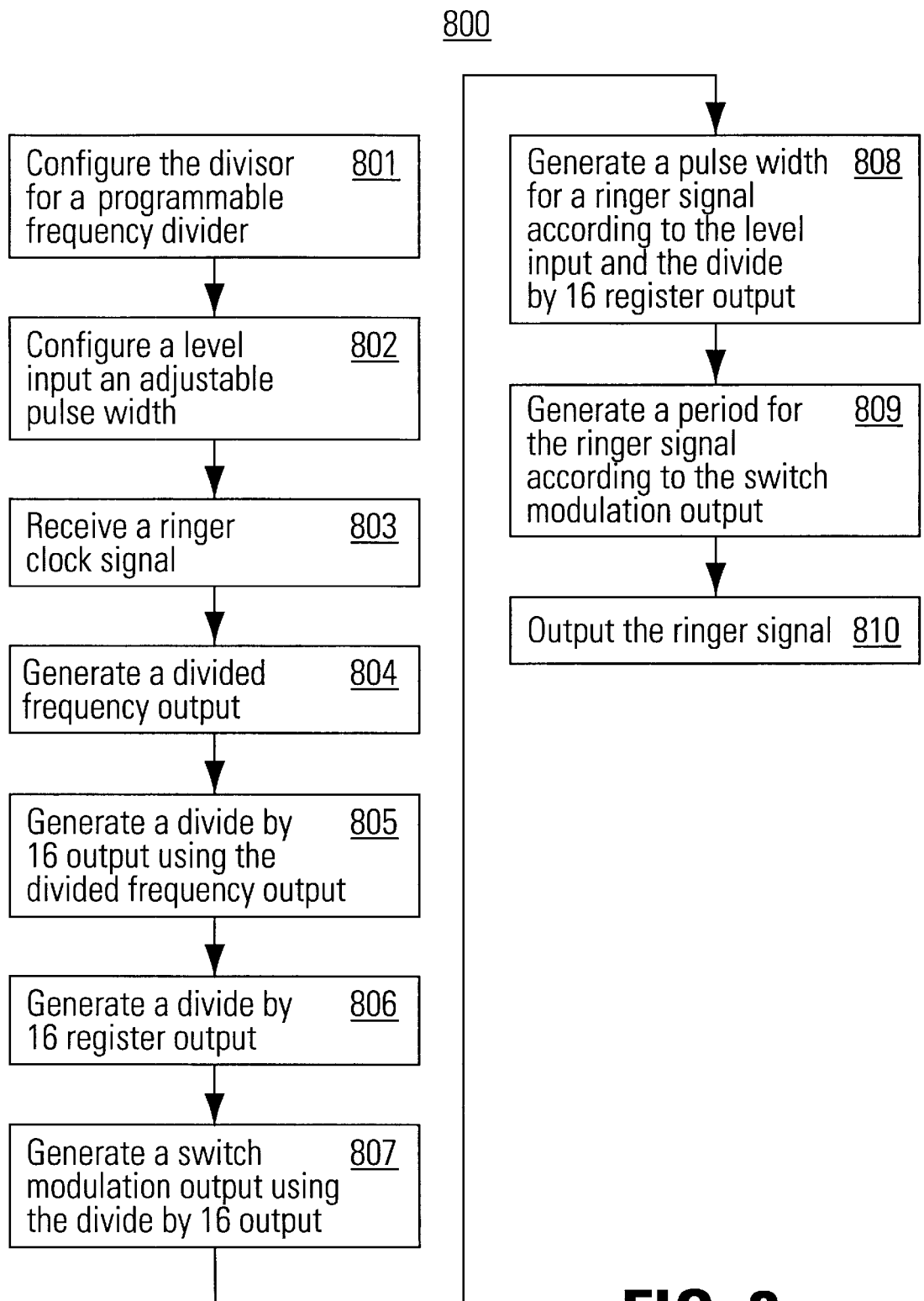
FIG. 8 shows a flow chart of the steps of a process in accordance with one embodiment of the present invention.

With reference now to FIG. 8, a flow chart of a process 800 in accordance with one embodiment of the present invention is shown. Process 800 illustrates the steps of a ringer interface circuit (e.g., ringer interface circuit 100 from FIG. 1A) outputting a ringer signal. Process 800 begins in step 801, where the divisor for the programmable frequency divider (e.g., programmable frequency divider 101) is configured. Upon initialization, the DIVFREQ register within the programmable frequency divider is loaded with the divisor value. This register is then recursively decremented to generate the divided frequency output.

In step 802, a level input is configured. As described above, the level input is comprised of a 3 bit input (e.g., LEVEL[2:0 ]) used to set the pulse width of the ringer signal. The level input is user programmable.

In step 803, the programmable frequency divider receives a ringer clock signal as an input (e.g., RNGclk). The ringer clock signal serves as the baseline frequency for the ringer interface circuit. With the exception of the ringer enable signal, the signals of the ringer interface circuit are synchronous with the ringer clock signal.

In step 804, a divided frequency output is generated. The divided frequency output is derived by recursively decrementing the DIVFREQ register within the programmable frequency divider. As described above, the DIVFREQ register is decremented synchronously with the RNGclk signal.

In step 805, a divide by 16 output (e.g., Div16Out) is generated. The divided frequency output (e.g., DivFreqOut) is received by a divide by 16 frequency divider (e.g., frequency divider 102) included within the ringer interface circuit of the present invention. The divided frequency output is used to recursively increment a 4 bit divide by 16 register (e.g., DIV16), which, in turn, generates the divide by 16 output.

In step 806, a divide by 16 register output is generated. The divide by 16 register output is comprised of a 4 bit signal (e.g., DIV16[3:0 ]) which describes the contents of the divide by 16 register. As the divide by 16 register is incremented, the divide by 16 register output is correspondingly incremented.

In step 807, a switch modulation output is generated. The divide by 16 output is received by a divide by 64 frequency divider (e.g., frequency divider 103) included within the ringer interface circuit of the present invention. The divide by 16 output is used to recursively increment a divide by 64 register (e.g., DIV64), which, in turn, generates the switch modulation output.

In step 808, a pulse width for the ringer signal is generated according to the level input (e.g., LEVEL[2:0 ]) and the divide by 16 register output (e.g., Div16[3:0 ]). The level input and the divide by 16 register output are received by a modulator (e.g., modulator 104) included within the ringer interface circuit of the present invention. The modulator uses the level input and the divide by 16 register output to set the pulse width of the ringer signal (hence, the divide by 16 register output can be viewed as a oversampled audio frequency signal).

In step 809, a period for the ringer signal is generated according to the switch modulation output. The switch modulation output (e.g., the Switch Modulation signal) is received by the modulator. The modulator uses the switch modulation output to set the period of the ringer signal (hence, the switch modulation output can be viewed as a period signal).

In step 810, the ringer signal is output by the modulator. The modulator uses standard differential output means (e.g., RINGP and RINGN) to output the ringer signal. As described above, the ringer signal has a pulse width according to the level input and the divide by 16 register output. The ringer signal also has a period in accordance with the switch modulation output. The ringer signal is subsequently coupled to control a telephone ringer.

Figure 9:
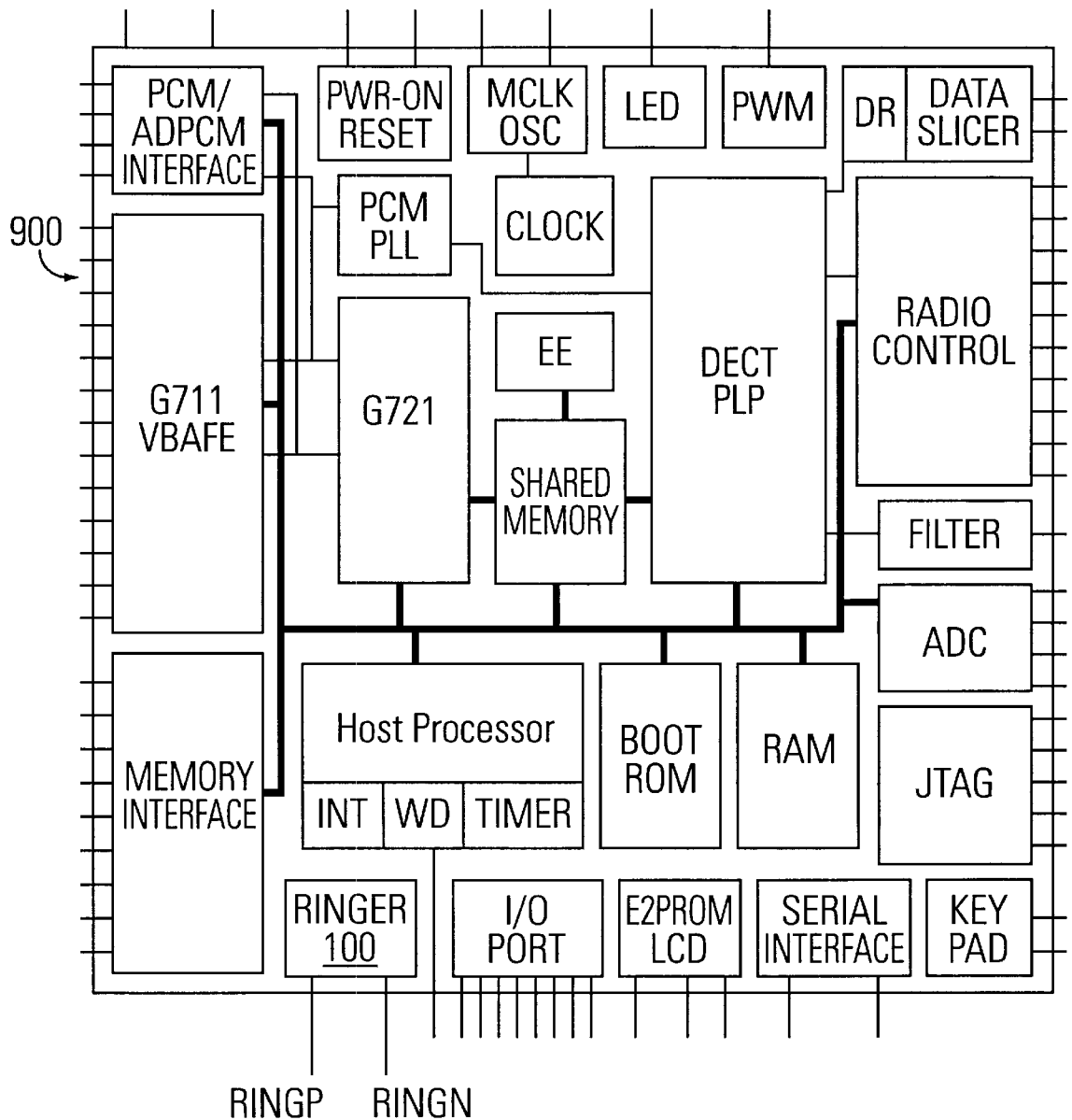
FIG. 9 shows the ringer interface circuit from FIG. 1A incorporated into a telecommunications integrated circuit in accordance with one embodiment of the present invention.

FIG. 9 shows the ringer interface circuit 100 incorporated into a telecommunications integrated circuit 900. As shown in FIG. 9, ringer interface circuit 100, in the present embodiment, is incorporated into a complex integrated circuit for a mobile phone system. As telecommunications circuits (e.g., integrated circuit 900) become more and more complex, it becomes increasingly important to conserve transistors and logic elements, and thus, silicon area. Prior art ringer interfaces are generally complex interfaces based upon burst logic (e.g., including ROM lookup tables, etc.) which are expensive with regard to silicon area. The present invention (e.g., ringer interface circuit 100), however, is much more compact, occupying much less silicon area. Hence, the present invention is less expensive than prior art ringer interfaces.

Thus, the present invention, a ringer interface circuit for generating a ringer signal to control a telephone ringer, is described. The ringer interface circuit of the present invention provides a variable ringer system which overcomes the problems associated with prior art ringer implementations. The system of the present invention is less expensive than prior art sine wave oscillator based variable ringers. The system of the present invention consumes less power than prior art ringer implementations. Additionally, the ringer interface circuit of the present invention is much less sensitive to noise.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A ringer interface circuit for generating a ringer signal to control a ringer in a telephone, comprising:
   a first frequency divider, said first frequency divider adapted to receive a ringer clock signal and generate a first frequency divider output therefrom;
   a second frequency divider coupled to receive said first frequency divider output, said second frequency divider adapted to generate a second frequency divider output using said first divider frequency output, said second frequency divider further adapted to generate a oversampled audio frequency signal;
   a third frequency divider coupled to receive said second frequency divider output, said third frequency divider adapted to generate a period signal using said second frequency divider output; and
   a modulator coupled to receive said oversampled audio frequency signal and said period signal, said modulator adapted to generate a ringer signal having a pulse width according to said oversampled audio frequency signal and a period according to said period signal, said modulator further adapted to output said ringer signal to control a telephone ringer.

2. The ringer interface circuit of claim 1, further comprising:
   a first register included within said first frequency divider, said first register adapted to count said ringer clock signal to generate said first frequency divider output.

3. The ringer interface circuit of claim 2 further comprising:
   a frequency input coupled to said first frequency divider and coupled to said first register, said frequency input adapted to load said first register with a divisor for generating said first frequency divider output.

4. The ringer interface circuit of claim 1, further comprising:
   a second register included within said second frequency divider, said second register adapted to count said first frequency divider output to generate said second frequency divider output.

5. The ringer interface circuit of claim 4, wherein the value of said second register is output by said second frequency divider as said oversampled audio frequency signal.

6. The ringer interface circuit of claim 1, further comprising:
   a third register included within said third frequency divider, said third register adapted to count said second frequency divider output to generate said period signal.

7. The ringer interface circuit of claim 1, wherein said modulator includes a positive and negative ringer frequency output such that said ringer signal is output differentially.

8. The ringer interface circuit of claim 1, further comprising:
   a ringer enable input coupled to said modulator, said first frequency divider, said second frequency divider, and said third frequency divider to enable or disable said ringer interface circuit.

9. A counter based ringer interface circuit for generating a ringer signal for controlling a ringer in a telephone, comprising:
   a first frequency divider, said first frequency divider adapted to receive a ringer clock signal and generate a first frequency divider output therefrom;
   a second frequency divider coupled to receive said first frequency divider output, said second frequency divider adapted to generate a second frequency divider output using said first divider frequency output, said second frequency divider further adapted to generate a oversampled audio frequency signal;

a third frequency divider coupled to receive said second frequency divider output, said third frequency divider adapted to generate a period signal using said second frequency divider output; and a modulator coupled to receive said oversampled audio frequency signal and said period signal, said modulator adapted to generate a ringer signal having a pulse width according to said oversampled audio frequency signal and a period according to said period signal, said modulator further adapted to output said ringer signal to control a telephone ringer, said modulator including a positive and negative ringer frequency output such that said ringer signal is output differentially;

a ringer enable input coupled to said modulator, said first frequency divider, said second frequency divider, and said third frequency divider to enable or disable said ringer interface circuit.

10. The ringer interface circuit of claim 9, further comprising:

a first register included within said first frequency divider, said first register adapted to count said ringer clock signal to generate said first frequency divider output.

11. The ringer interface circuit of claim 2 further comprising:

a frequency input coupled to said first frequency divider and coupled to said first register, said frequency input adapted to load said first register with a divisor for generating said first frequency divider output.

12. The ringer interface circuit of claim 9, further comprising:

a second register included within said second frequency divider, said second register adapted to count said first frequency divider output to generate said second frequency divider output.

13. The ringer interface circuit of claim 4, wherein the value of said second register is output by said second frequency divider as said oversampled audio frequency signal.

14. The ringer interface circuit of claim 9, further comprising:

a third register included within said third frequency divider, said third register adapted to count said second frequency divider output to generate said period signal.

15. In a counter based ringer interface circuit coupled to a ringer in a telephone, a method of generating a ringer signal for controlling the ringer, the method comprising the steps of:

a) receiving a ringer clock signal;

b) generating a first divided frequency output using the ringer clock signal;

c) generating a second divided frequency output using the first divided frequency output;

d) generating a register output by counting the first divided frequency output;

e) generating a period output by counting the second divided frequency output;

f) generating a ringer signal having a pulse width according to said register output and a level setting and a period according to said period output; and g) outputting said ringer signal to control the ringer of a telephone.

16. The method of claim 15, wherein step a) further includes receiving a frequency input and generating said first divided frequency output in accordance with said frequency input.

17. The method of claim 15, wherein step f) further includes the step of receiving a level signal and generating said ringer signal such that said ringer signal has a pulse width in accordance with said level signal and said pulse width output.

* * * * *